(12) United States Patent
Hüttl et al.

(10) Patent No.: US 10,766,346 B2
(45) Date of Patent: Sep. 8, 2020

(54) LIQUID-COOLED ELECTRIC DRIVE SYSTEM

(71) Applicant: AUDI AG, Ingolstadt (DE)

(72) Inventors: Martin Hüttl, Ingolstadt (DE); Stefan Till, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/374,921

(22) Filed: Apr. 4, 2019

(65) Prior Publication Data

US 2019/0337373 A1 Nov. 7, 2019

(30) Foreign Application Priority Data

May 7, 2018 (DE) .......... 10 2018 207 007

(51) Int. Cl.
*B60K 1/00* (2006.01)
*B60K 1/02* (2006.01)

(52) U.S. Cl.
CPC .......... *B60K 1/02* (2013.01); *B60L 2240/425* (2013.01)

(58) Field of Classification Search
CPC .. B60K 1/02; B60K 17/16; B60L 3/10; B60L 2240/425
See application file for complete search history.

(56) References Cited

U.S. PATENT DOCUMENTS

| | | | | |
|---|---|---|---|---|
| 6,101,987 A * | 8/2000 | Saur | .......... | F01P 7/048 123/41.1 |
| 6,198,183 B1 * | 3/2001 | Baeumel | .......... | F04D 25/068 310/52 |
| 7,345,386 B2 * | 3/2008 | Dano | .......... | H02K 11/33 310/61 |
| 7,739,005 B1 | 6/2010 | Tang | | |
| 9,331,543 B2 * | 5/2016 | Hamer | .......... | H02K 5/20 |
| 2007/0038340 A1 * | 2/2007 | Sekiguchi | .......... | B60L 3/10 701/22 |
| 2012/0133314 A1 | 5/2012 | Kozarekar et al. | | |
| 2012/0153718 A1 * | 6/2012 | Rawlinson | .......... | F16H 57/0476 307/10.1 |
| 2012/0247716 A1 * | 10/2012 | Galtz | .......... | B60H 1/00278 165/42 |
| 2012/0299401 A1 * | 11/2012 | Prucher | .......... | H02K 3/47 310/43 |
| 2013/0173100 A1 * | 7/2013 | Takagi | .......... | G05D 17/02 701/22 |
| 2014/0182954 A1 * | 7/2014 | Weber | .......... | B60K 17/16 180/65.7 |

(Continued)

FOREIGN PATENT DOCUMENTS

| | | |
|---|---|---|
| DE | 29 42 811 A1 | 5/1981 |
| DE | 199 03 443 A1 | 8/2000 |
| DE | 10 2004 049 795 A1 | 11/2005 |

(Continued)

OTHER PUBLICATIONS

Examination Report dated Oct. 18, 2018 of corresponding German application No. 10 2018 207 007.5; 13 pages.

(Continued)

*Primary Examiner* — Hau V Phan
(74) *Attorney, Agent, or Firm* — Maier & Maier, PLLC

(57) ABSTRACT

A liquid-cooled electric drive system for a motor vehicle and a method of operating the drive system.

13 Claims, 1 Drawing Sheet

(56) References Cited

U.S. PATENT DOCUMENTS

2016/0129754 A1* 5/2016 Rapp .................. B60H 1/00914
165/287
2018/0029499 A1* 2/2018 Lai ........................... H02P 6/04

FOREIGN PATENT DOCUMENTS

| DE | 10 2008 054 699 A1 | 6/2010 |
| DE | 102014218453 A1 | 3/2016 |
| WO | 2012/045386 A1 | 4/2012 |
| WO | 2014/053316 A2 | 4/2014 |

OTHER PUBLICATIONS

European Search Report dated Jul. 23, 2019, in corresponding European patent application No. 19164806.2 including partial machine-generated English language translation; 8 pages.

* cited by examiner

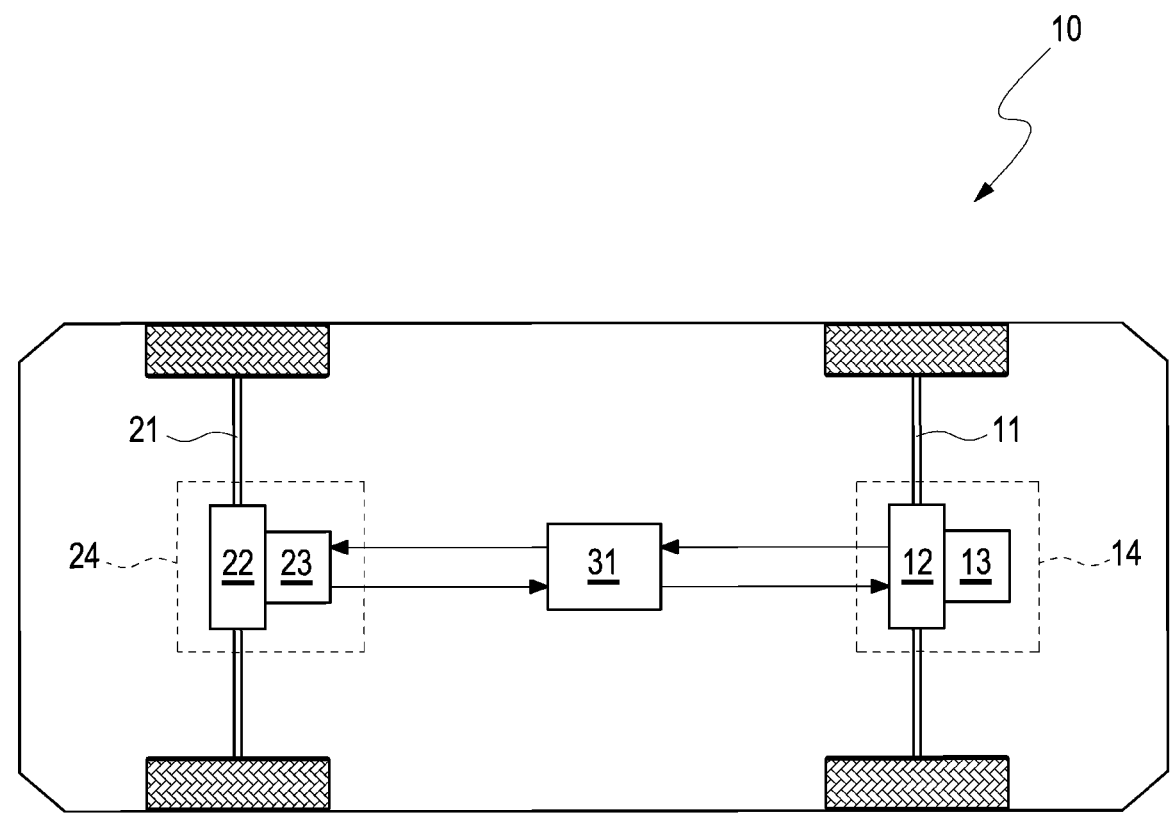

LIQUID-COOLED ELECTRIC DRIVE SYSTEM

FIELD

The invention relates to a liquid-cooled electric drive system for a motor vehicle and a method of operating the drive system.

BACKGROUND

The operation of a liquid-cooled electric drive, which comprises at least one electric machine and a pulse inverter with associated power electronics, requires electric coolant pumps which are supplied via the 12V on-board power supply. The additional pumps serve to ensure a minimum volume flow in the components so that the waste heat is transferred to the cooling medium due to the resulting power loss of the components. The cooling medium is then cooled in the cooling unit and returned to the components. In an electric vehicle with a multi-machine concept, both the front axle and the rear axle are connected to the cooling system.

If cooling problems occur that lead to a reduced coolant volume flow or a failure of the coolant volume flow, the resulting waste heat leads to the failure of all electric drives in the vehicle, within a very short time. The vehicle can no longer be moved independently.

In most cases, modern electric vehicles are equipped with several electric drives.

For example, DE 199 03 443 A1 describes a drive unit for an electrically powered vehicle. The vehicle uses a gearbox in which at least two electric machines are accommodated in a gearbox housing and operated alternately.

Special designs of liquid-cooled e-machines are already known in which the coolant is distributed in the e-machine without an additional coolant pump.

DE 10 2004 049 795 A1, for example, discloses a cooling device for an electric machine that can be cooled with a cooling liquid, in which cooling liquid is introduced into a rotor of an electric machine via a feed device and is distributed within the electric machine by the acting centrifugal forces. The cooling liquid is discharged from the electric machine via a discharge device and fed to a cooling liquid cooler.

DE 29 42 811 A1 discloses a liquid cooling device for the rotor winding of an electric machine. The electric machine circulates a cooling liquid using centrifugal pressure.

Against this background, the object of the present invention is to least partially eliminate the disadvantages of the prior art.

SUMMARY

The object is solved according to the invention by a drive system with the features of the system and a method.

The invention is based on the realization that, in an electric vehicle driven by several electric machines, a sufficient cooling function can be achieved in most driving situations by suitable operation or suitable control of the electric machines even without a separate electric coolant pump.

The object of the invention is a liquid-cooled electric drive system for a motor vehicle. The drive system has at least two drive units, each comprising an electric machine and its associated power electronics unit. The drive units are connected to a coolant circuit in the vehicle.

In one embodiment, each wheel of the motor vehicle is driven individually by a drive unit assigned to the respective wheel. A four-wheeled vehicle therefore has four drive units that enable an axle-specific 4-wheel drive.

The invention-related drive system comprises a drive control unit (DCU) which is designed to distribute the drive power provided by the drive system between the drive units in dependence of the temperature of the components of the drive units.

In one embodiment, the drive control unit is adapted to reduce the drive power provided by the drive unit(s), the components of which have a higher overall temperature than the components of the other drive unit(s), and to increase the drive power provided by the drive unit(s), the components of which have a lower overall temperature, to provide the required overall drive power. If more than two drive units are provided, the drive power of each drive unit is adjusted, e.g., reduced or increased, depending on how the temperature of the components of this drive unit reacts in relation to the temperature of the components of the other drive units.

The respective drive power of drive units, the components of which have a higher temperature than components of other drive units, is reduced in comparison to these other drive units and/or the respective drive power of these other drive units is increased. The total drive power of all drive units results in the required overall drive power.

In one embodiment, the drive control unit (DCU) reads in the temperatures of the components of the installed electric machines and power electronics and distributes the drive power from the front axle to the rear axle and vice versa, depending on the current actual temperature of the components.

In one embodiment of the drive system according to the invention, its coolant circuit does not include a coolant pump other than the electric machines. There is therefore no separate coolant pump for conveying the coolant in the coolant circuit.

In one embodiment, the cooling effect of the heat radiation of the components or the airflow is used to cool the drive components and the coolant.

In another embodiment, the coolant is conveyed through the coolant circuit by centrifugal forces occurring in the electric machines. The electric machines (e-machines) generate a self-supplying pump effect during operation above a certain speed, which in turn generates an additional cooling effect on the drive axle that was deactivated in the meantime. Experience has shown that a sufficient coolant volume flow is achieved in electric machines from a speed of approx. 40 km/h.

The DCU regulates the distribution of the target torque requirement such that, although the power loss is reduced, the torque required to achieve the desired speed or the speed required for the self-feeding pumping effect of the e-machines is provided.

The object of the invention is also a method for operating a liquid-cooled electric drive system for a motor vehicle, which has at least two drive units comprising an electric machine and associated power electronics unit.

According to the invention, the drive power provided by the drive system is divided between the drive units depending on the respective temperature of the components of the drive units.

In one embodiment of the method, the drive power provided by the drive unit or drive units, the components of which have the higher temperature is reduced and the drive power provided by the drive unit or drive units, the components of which have the lower temperature is increased.

According to the invention, the drive power is divided between the front axle and the rear axle so that the e-machine and the pulse inverter are only operated on the corresponding axle if their temperature permits this. If the actual temperature is too high, the drive power is allocated to the respective other drive axle. This gives the previously used drive axle a recovery phase to cool down and makes it available again. The multi-machine concept offers the possibility of changing the target torque setting according to demand and dividing it between the installed e-machines, e.g., if the cooling system fails. This is particularly interesting for a limp-home mode if the coolant pump is defective.

In one embodiment, the intelligent temperature-based control of the target torque specification during a failure situation is used to extend vehicle availability or for energy-saving operation of coolant pumps in the coolant circuit.

If torque generation causes the temperature of the stationary coolant in all available electric drives to rise to critical limits, the coolant must be pumped over through the coolant circuit. This function can now be realized by the e-machines themselves instead of using a coolant pump.

The pump effect occurs without conveying elements (e.g., a worm gear) only through the generated centrifugal force. At a certain speed, the centrifugal force is sufficient to produce the necessary displacement response and the resulting coolant volume flow. This allows the components to be sufficiently cooled again so that they can once again be used for propulsion and therefore for once again exceeding the limit speed for continuous operation.

In one embodiment of the method, the electric machines are operated at a speed at which the coolant is conveyed through the cooling circuit by centrifugal forces occurring in the electric machines.

The drive system according to the invention and the method according to the invention offer the advantage that operation of the electric drive is also possible without or with reduced coolant capacity. This can save costs, weight and energy. This can also ensure that the motor vehicle can run in emergency mode if the coolant pump is defective.

Further advantages and embodiments of the invention result from the description and the enclosed drawing.

It will be appreciated that the features mentioned above and the features explained below can be used not only in the combination indicated, but also in other combinations or on their own, without leaving the scope of the present invention.

BRIEF DESCRIPTION OF THE FIGURE

The invention is shown schematically in the drawing by means of an embodiment and is described schematically and in detail with reference to the drawing. In the drawings:

FIG. 1 is a schematic view of an embodiment of the drive system according to the invention.

DETAILED DESCRIPTION

FIG. 1 shows a schematic view of an embodiment of the drive system 10 according to the invention. The image shows a two-axle motor vehicle. A first axle 11 is assigned a first electric machine 12 (EM) and a first power electronics unit 13 (PE) controlling it. A second axle 21 is assigned a second electric machine 22 (EM) and a second power electronics unit 23 (PE) controlling it. A drive control unit 31 (DCU) communicates with the respective drive units 12/13 and 22/23, each comprising an electric machine 12, 22 and the associated power electronics unit 13, 23.

The DCU 31 reads the component temperatures of the installed e-machines 12, 22 and the power electronics 13, 23, and distributes the drive power between the axles 11 and 21 depending on the current actual temperature of the components. If the temperature of the components of EM 12 and PE 13 of axle 11 is higher than the temperature of the components of EM 22 and PE 23 of axle 21, the DCU 31 shifts drive power from axle 11 to axle 21. Conversely, the DCU 31 shifts drive power from axle 21 to axle 11 if the temperature of the components of EM 22 and PE 23 of axle 21 is higher than the temperature of the components of EM 12 and PE 13 of axle 11.

The DCU 31 automatically distributes the available drive power of the drive units 14 and 24 to reduce the power loss of the currently hotter drive unit, on the one hand, while—on the other hand—providing the torque required to reach the speed threshold at which the speed of the electric machines 12 and 22 is sufficient to provide adequate coolant flow through the coolant circuit of the electric drive system 10.

Experience shows that from a speed of approx. 40 km/h, an adequate coolant volume flow is generated by the centrifugal forces acting in the electric machines 12 and 22. Test drives show that, in normal customer cycles, propulsion can be maintained for an unlimited period of time with slightly reduced drive power. Higher final speeds can therefore also be achieved without a separate coolant pump.

The invention claimed is:

1. A liquid-cooled electric drive system for a motor vehicle, comprising:
    at least two drive units, each drive unit having components including an electric machine and associated power electronics which are connected to a coolant circuit of the motor vehicle, and
    a drive control unit which is set up to distribute the drive power produced by the drive system between the drive units depending on the temperature of the components of the drive units, wherein the drive control unit is adapted to reduce the drive power provided to the drive unit whose components have the higher temperature and to increase the drive power provided to the drive unit whose components have the lower temperature.

2. The liquid-cooled electric drive system of claim 1, wherein the coolant circuit has no coolant pump other than the electric machines.

3. The liquid-cooled electric drive system of claim 2, wherein the coolant is conveyed through the coolant circuit by centrifugal forces occurring in the electric machines.

4. The liquid-cooled electric drive system of claim 2, wherein each wheel is individually driven by an associated drive unit.

5. The liquid-cooled electric drive system of claim 1, wherein the coolant is conveyed through the coolant circuit by centrifugal forces occurring in the electric machines.

6. The liquid-cooled electric drive system of claim 5, wherein each wheel is individually driven by an associated drive unit.

7. The liquid-cooled electric drive system of claim 1, wherein each wheel is individually driven by an associated drive unit.

8. The liquid-cooled electric drive system of claim 1, wherein the coolant circuit has no coolant pump other than the electric machines.

9. The liquid-cooled electric drive system of claim 1, wherein the coolant is conveyed through the coolant circuit by centrifugal forces occurring in the electric machines.

10. The liquid-cooled electric drive system of claim 1, wherein each wheel is individually driven by an associated drive unit.

11. A method for operating a liquid-cooled electric drive system for a motor vehicle, comprising:
   at least two drive units each having components including an electric machine and power electronics assigned to it, wherein the drive power produced by the drive system is divided between the drive units depending on the temperature of the components of the drive units, wherein the drive power provided to the drive unit whose components have the higher temperature is reduced, and the drive power provided to the drive unit whose components have the lower temperature is increased.

12. The method of claim 11, in which the electric machines are operated at a speed at which the coolant is conveyed through the coolant circuit by centrifugal forces occurring in the electric machines.

13. The method of claim 11, in which the electric machines are operated at a speed at which the coolant is conveyed through the coolant circuit by centrifugal forces occurring in the electric machines.

\* \* \* \* \*